(12) United States Patent
Prokop et al.

(10) Patent No.: US 10,512,965 B2
(45) Date of Patent: Dec. 24, 2019

(54) DEVICE AND METHOD FOR MUTUAL SEPARATION OF TWO WORKPIECE COMPONENTS OF A PLATE-LIKE WORKPIECE

(71) Applicants: TRUMPF Werkzeugmaschinen GmbH + Co. KG, Ditzingen (DE); J. Schmalz GmbH, Glatten (DE)

(72) Inventors: Heinz-Juergen Prokop, Essen (DE); Peter Epperlein, Leonberg (DE); Thomas Eisele, Alpirsbach-Peterzell (DE); Walter Dunkmann, Baden-Baden (DE); Magnus Deiss, Stuttgart (DE); Frank Schmauder, Metzingen (DE)

(73) Assignees: TRUMPF Werkzeugmaschinen GmbH + Co. KG, Ditzingen (DE); J. Schmalz GmbH, Glatten (DE)

( * ) Notice: Subject to any disclaimer, the term of this patent is extended or adjusted under 35 U.S.C. 154(b) by 387 days.

(21) Appl. No.: 15/357,362

(22) Filed: Nov. 21, 2016

(65) Prior Publication Data
US 2017/0066033 A1    Mar. 9, 2017

Related U.S. Application Data

(63) Continuation of application No. PCT/EP2015/059314, filed on Apr. 29, 2015.

(30) Foreign Application Priority Data

May 22, 2014    (DE) ......................... 10 2014 209 811

(51) Int. Cl.
*B21D 45/02* (2006.01)
*B21D 28/06* (2006.01)
(Continued)

(52) U.S. Cl.
CPC ............. *B21D 45/02* (2013.01); *B21D 28/06* (2013.01); *B21D 43/282* (2013.01); *B26D 7/1818* (2013.01); *B26D 7/1836* (2013.01)

(58) Field of Classification Search
CPC ...... B21D 28/06; B21D 43/282; B21D 45/02; B26D 7/1818; B26D 7/186; B65G 47/912
See application file for complete search history.

(56) References Cited

U.S. PATENT DOCUMENTS

| 4,806,071 A | 2/1989 | Sartorio |
| 5,036,736 A * | 8/1991 | Hillock ................. B21D 43/20 83/100 |

(Continued)

FOREIGN PATENT DOCUMENTS

| CN | 1116980 | 2/1996 |
| CN | 201592464 | 9/2010 |

(Continued)

OTHER PUBLICATIONS

International Search Report for corresponding PCT Application No. PCT/EP2015/059314, dated Jul. 3, 2015, 6 pages.

*Primary Examiner* — Jacob J Cigna
(74) *Attorney, Agent, or Firm* — Fish & Richardson P.C.

(57) ABSTRACT

Devices for separating two workpiece parts, e.g., metal sheets, from one another are described and include a workpiece mounting, a lifting device arranged on one side of the workpiece mounting, and a counter-holder arranged on the opposite side of the workpiece mounting. The counter-holder can be transferred into a fixing state and into a releasing state. One of the workpiece parts to be separated from one another is provided as a removal part, the other as a remaining part. For separating the two workpiece parts, the removal part, which is acted upon by the lifting device and supported by the counter-holder, can be moved by means of the lifting device perpendicular to the mounting in relation (Continued)

to the remaining part by a removal movement. At least in the releasing state, the counter-holder forms a rigid abutment in the lifting direction for the removal part. The rigid abutment has the effect that the removal part is aligned parallel to the mounting. Machine-based systems include a processing unit for producing two workpiece parts from a sheet-like workpiece and a separating device as described herein. Methods for separating two workpiece parts of a sheet-like workpiece are carried out by means of the devices described herein and can be part of a machine-based process.

18 Claims, 12 Drawing Sheets

(51) Int. Cl.
  *B21D 43/28* (2006.01)
  *B26D 7/18* (2006.01)

(56) References Cited

U.S. PATENT DOCUMENTS

| | | | | |
|---|---|---|---|---|
| 5,889,675 A | * | 3/1999 | Minami | B25J 9/1612 198/434ke |
| 6,055,895 A | * | 5/2000 | Kanazawa | B21D 43/18 414/752.1 |
| 6,826,989 B1 | * | 12/2004 | Wattles | A22C 17/0093 83/102 |
| 7,045,740 B2 | * | 5/2006 | Leibinger | B23K 26/0884 219/121.82 |

FOREIGN PATENT DOCUMENTS

| | | | | |
|---|---|---|---|---|
| CN | 102528152 | | 7/2012 | |
| DE | 3800907 | | 7/1988 | |
| DE | 19616204 | | 1/1997 | |
| EP | 0348311 A1 | * | 12/1989 | B25J 15/0616 |
| EP | 0767018 | | 4/1997 | |
| EP | 0767018 B1 | | 3/1999 | |
| EP | 2177293 A1 | | 4/2010 | |
| JP | 560-195185 | | 12/1985 | |
| JP | 563-278694 | | 11/1988 | |
| JP | H01-165137 | | 11/1989 | |
| JP | 04187333 A | * | 6/1992 | |
| JP | 4187333 A | | 7/1992 | |
| JP | H04-187333 | | 7/1992 | |
| JP | H05-293559 | | 11/1993 | |
| JP | 2008142875 A | * | 6/2008 | H01L 21/4842 |
| JP | 2009202330 A | | 9/2009 | |
| WO | WO2014023323 A1 | | 2/2014 | |

\* cited by examiner

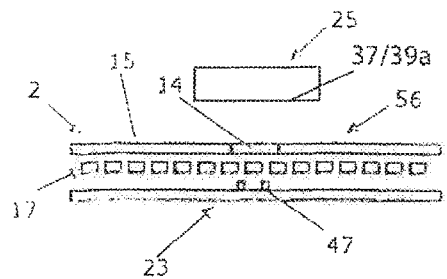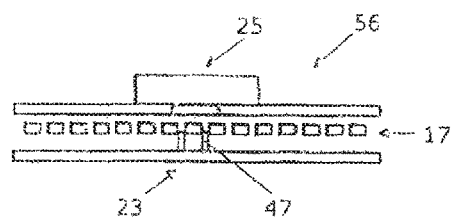
Fig. 12A        Fig. 12B
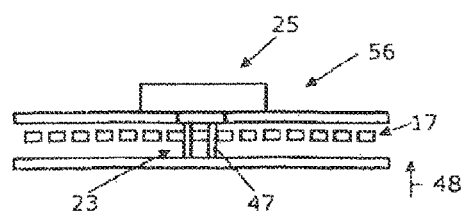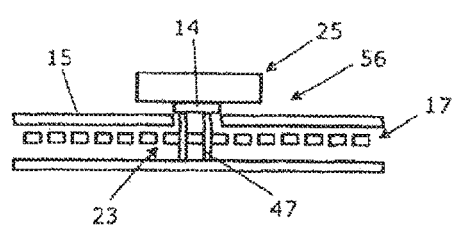
Fig. 12C        Fig. 12D
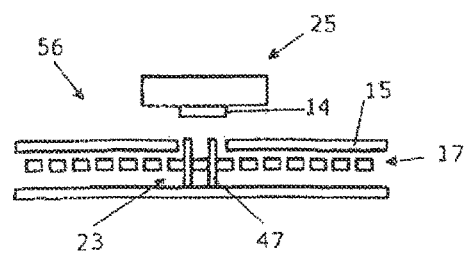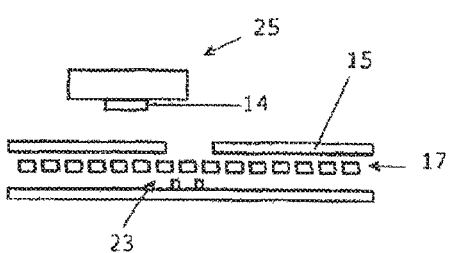
Fig. 12E        Fig. 12F

DEVICE AND METHOD FOR MUTUAL SEPARATION OF TWO WORKPIECE COMPONENTS OF A PLATE-LIKE WORKPIECE

CROSS-REFERENCE TO RELATED APPLICATIONS

This application is a continuation of and claims priority under 35 U.S.C. § 120 to PCT Application No. PCT/EP2015/059314 filed on Apr. 29, 2015, which claims priority to German Application No. DE 10 2014 209 811.4, filed on May 22, 2014. The entire contents of these priority applications are incorporated herein by reference.

TECHNICAL FIELD

The invention relates to devices for mutual separation of two workpiece components of a plate-like workpiece, such as metal sheets.

BACKGROUND

The manual and/or automatic removal of a workpiece component produced during a separation processing operation, for instance, a workpiece component produced during a punching operation or (laser) cutting of metal sheets, from the remaining workpiece, can be difficult, because the workpiece component and the remaining workpiece are generally located in a common plane defined by a workpiece bearing and are separated from each other only by a narrow separation gap. The workpiece component and the remaining workpiece are located at the same level and accordingly overlap each other perpendicularly to the plane defined by the workpiece bearing. When the workpiece component is unloaded, it may get stuck on the remaining workpiece. The possible consequences are production interruptions and also damage to the workpiece component intended to be removed and where applicable also to the device used to remove the workpiece component.

Measures for ensuring the highest possible level of operational reliability when automatically removing a workpiece component from a remaining workpiece are known, e.g., from EP 2 177 293 A1. In the case of the prior art, a workpiece component is supported together with a residual workpiece, which is also produced during the preceding workpiece processing operation, on a workpiece support of a machine tool. A device for mutual separation of the workpiece component and the remaining workpiece includes a height-adjustable support element which is arranged at the lower side of the workpiece component and a suction gripper that acts as a counter-holder at the upper side of the workpiece component. To remove the workpiece component from the remaining workpiece, a suction gripper is first placed on the workpiece component. Subsequently, a vacuum is applied to the suction gripper. The suction gripper is thereby transferred from the initial release state into the fixing state and the suction gripper is attached to the workpiece component by suction. After the workpiece is attached to the suction gripper, the support element at the lower side of the workpiece component is lifted and moved in a lifting direction in a synchronous manner with the suction gripper, which is further in the fixing state, and the workpiece component, which is clamped between the support element and the suction gripper. The workpiece component clamped between the support element and the suction gripper is thereby lifted out of the remaining workpiece. Finally, the support element is lowered into the initial position thereof and the suction gripper moves with the workpiece component which is now attached to the suction gripper to a store in which it deposits the workpiece component.

In the case of the prior art, the suction gripper attached to the workpiece component may not laterally protrude with respect to the workpiece component, because otherwise, as a result of the vacuum applied to the suction gripper, the remaining workpiece that surrounds the workpiece component is also subject to the vacuum, which makes removal of the workpiece component more difficult or impossible. Accordingly, the previously known suction gripper must have a dimension that is adapted to the workpiece component intended to be removed and furthermore be positioned with respect to the workpiece component in such a manner that a lateral overhang of the suction gripper with respect to the workpiece component is avoided.

SUMMARY

The invention relates to devices for mutual separation of two workpiece components of a plate-like workpiece, e.g., metal sheets. The devices include a workpiece bearing that defines a support plane that, when supporting the two workpiece components intended to be separated from each other, supports them with mutual overlapping perpendicular to the support plane; a lifting apparatus arranged at a side of the support plane to act on one of the workpiece components intended to be separated from each other as a removal component perpendicular to the support plane in a lifting direction, and a counter-holder arranged at a side of the support plane opposite the side of the lifting apparatus to provide effective support in the lifting direction for the removal component that is acted on by the lifting apparatus, wherein the counter holder can be transferred into a fixing state and into a releasing state, wherein the removal component acted on by the lifting apparatus and supported by the counter-holder, is fixed to the counter-holder in the fixing state of the counter-holder and is released from the counter-holder in the releasing state of the counter-holder and by means of the lifting apparatus can be moved perpendicularly to the support plane relative to the other workpiece component provided as a remaining component with a removal movement in the lifting direction and can thereby be separated from the remaining component, and wherein the counter-holder, at least in the releasing state, forms an abutment for the removal component acted on by the lifting apparatus in the lifting direction, which abutment is rigid in the lifting direction and supports the removal component during the removal movement with an orientation in parallel with the support plane.

In some implementations the counter-holder can be transferred into the releasing state at the beginning of the removal movement and into the fixing state after the removal movement is at least partially completed, and wherein the counter-holder during the removal movement in the releasing state or in the fixing state forms the rigid abutment for the removal component.

In certain implementations, the rigid abutment for the removal component forms a retention device that can be transferred into an operational state associated with the fixing state of the counter-holder and into a non-operational state associated with the releasing state of the counter-holder, wherein the removal component in the operational state of the retention device can be fixed thereby to the counter-holder and, in the non-operational state of the retention device, is released from the counter-holder.

In some implementations, the counter-holder includes in addition to the rigid abutment for the removal component a retention device that can be transferred into an operational state associated with the fixing state of the counter-holder and into a non-operational state associated with the releasing state of the counter-holder, wherein the removal component in the operational state of the retention device can be fixed thereby to the counter-holder and, in the non-operational state of the retention device, is released from the counter-holder.

In these devices, the counter-holder can form the rigid abutment for the removal component by means of a support body that is rigid in the lifting direction and wherein the retention device of the counter-holder can be moved relative to the support body in the lifting direction and in a direction opposite to the lifting direction. In some devices, the support body can be moved by a relative movement of the support body and the retention device with respect to the retention device into a position in which the support body is offset with respect to the retention device in the opposite direction to the lifting direction.

In some implementations, the rigid abutment formed by the counter-holder for the removal component has a plurality of abutment locations spaced apart from each other parallel with the support plane and on which the rigid abutment, during the removal movement, supports the removal component in the lifting direction with an orientation parallel with the support plane.

In certain implementations, the devices can further include a movement unit by means of which the lifting apparatus and the removal component that is intended to be separated from the remaining component can be positioned with a positioning movement relative to each other in a lifting position in which the removal component that is intended to be separated from the remaining component can be acted on by the lifting apparatus in the lifting direction and can be moved with the removal movement in the lifting direction with an orientation parallel to the support plane.

In some implementations, the movement unit further includes a movement control system that controls the positioning movement brought about by the movement unit in accordance with at least one of an inherent rigidity, a shape, and a dimension of the removal component.

In various implementations, the lifting apparatus further includes an adjusting device arranged to adjust a force with which the lifting apparatus acts on the removal component in the lifting direction. In some embodiments, the lifting apparatus includes at least one lifting device actuated in a controlled manner to act on and move the removal component with the removal movement in the lifting direction with an orientation parallel with the support plane. For example, the lifting device can be or include a lifting pin. In some embodiments, the lifting apparatus includes a plurality of lifting devices that can be actuated in a controlled manner independently of each other. For example, the lifting devices can form the workpiece bearing.

In some implementations, the workpiece bearing includes a plate-like workpiece support with a main plate plane that extends parallel with the support plane, wherein the lifting apparatus is arranged at one side of the plate-like workpiece support and the counter-holder is arranged at a side of the plate-like workpiece support opposite the side of the lifting apparatus, and wherein the plate-like workpiece support has at least one through-opening through which the removal component can be acted on in the lifting direction by means of the lifting apparatus. Some of these devices can further include an adjusting device arranged to position the workpiece components that are intended to be separated from each other, and the plate-like workpiece support, relative to each other parallel with the main plate plane.

In another aspect, the invention includes systems that include a processing device for a separating processing operation for plate-like workpieces by means of which two workpiece components can be produced from a plate-like workpiece, and one or more devices as described herein arranged for mutual separation of the two workpiece components produced by the processing device. These systems can further include a common workpiece bearing as the workpiece bearing of the device for mutual separation of the two workpiece components and as a workpiece bearing of the processing device, wherein the common workpiece bearing is configured to support a plate-like workpiece in the processing device during the production of the two workpiece components.

In some implementations of these systems, the counter-holder of the device for mutual separation of the two workpiece components can be configured to be moved into a processing position and into an unloading position of at least one of the two workpiece components, wherein the two workpiece components are produced in the processing position by means of the processing device and are separated from each other in the unloading position by means of the device for mutual separation of the two workpiece components.

In some embodiments, the counter holder of the device for mutual separation of the two workpiece components is configured to position the two workpiece components relative to each other in a predetermined position when the two workpiece components are produced by means of the processing device, wherein the counter-holder is moved into the processing position of at least one of the two workpiece components.

The systems can further include a workpiece transfer device configured to move together the two workpiece components after they have been produced from the respective processing position into the respective unloading position, wherein the counter-holder of the device for mutual separation of the two workpiece components is configured to be jointly moved with the two workpiece components and to position the two workpiece components moved together from the respective processing position into the respective unloading position in a predetermined position relative to each other.

In some implementations of these systems, the counter-holder of the device for mutual separation of the two workpiece components is configured to position the two workpiece components in a predetermined position relative to each other when the counter-holder has been transferred into the fixing state.

In another aspect, the invention includes methods for mutual separation of two workpiece components of a plate-like workpiece. The methods include supporting the two workpiece components that are intended to be separated from each other by means of a workpiece bearing with mutual overlapping perpendicular to a support plane defined by the workpiece bearing; lifting one of the workpiece components which are intended to be separated from each other in a lifting direction perpendicularly to the support plane by a lifting apparatus arranged at one side of the support plane, wherein the lifted workpiece component is provided as a removal component; supporting the removal component that is lifted by the lifting apparatus in the lifting direction by a counter-holder that can be transferred into a fixing state and into a releasing state and that is arranged at a side of the support plane opposite a side of the lifting apparatus; and moving the removal component which is, on the one hand, acted on by the lifting apparatus and which is, on the other hand, supported by the counter-holder with a removal movement in the lifting direction by the lifting apparatus perpendicular to the support plane relative to the other workpiece component provided as a remaining component and thereby separating the removal component from the remaining component, wherein the removal component which is lifted by the lifting apparatus in the lifting direction is supported in a rigid manner by the counter-holder in the lifting direction with a parallel orientation with respect to the support plane, which counter-holder is in the releasing state in which the removal component is released therefrom.

These methods can further include transferring the counter-holder into the releasing state before the beginning of the removal movement and into the fixing state after the removal movement is at least partially completed; and supporting the removal component during the removal movement by means of the counter-holder that has been transferred into the releasing state in the lifting direction with an orientation that is parallel with the support plane.

In yet another aspect, the invention includes manufacturing methods that include producing two workpiece components from a plate-like workpiece by a separating workpiece processing operation; and separating the two workpiece components from each other after the production thereof using the methods described herein for mutual separation of the two workpiece components. These manufacturing methods can further include producing the two workpiece components in a processing position; separating the two workpiece components from each other in an unloading position; and moving the counter-holder into the processing position and into the unloading position of at least one of the two workpiece components.

In some implementations of these manufacturing methods, the two workpiece components, during the production thereof, can be positioned relative to each other in a predetermined position by the counter-holder that has been moved into the processing position of at least one of the two workpiece components. In other implementations, the two workpiece components, after they have been produced, can be moved together from the respective processing position into the respective unloading position, wherein the counter-holder is jointly moved with the two workpiece components, and wherein the two workpiece components, when they are moved together from the respective processing position into the respective unloading position, are positioned relative to each other in a predetermined position by the jointly moved counter-holder.

In some embodiments, the two workpiece components are positioned relative to each other in a predetermined position by the counter-holder that has been transferred into the fixing state. Alternatively, or in addition, the two workpiece components are positioned relative to each other in a predetermined position by the counter-holder that has been transferred into the fixing state.

An object of the present invention is to improve the operational reliability during mutual separation of workpiece components and remaining workpieces.

In the case of the invention, the counter-holder which can be selectively switched into the release state or the fixing state forms at least in the release state an abutment which is rigid in the lifting direction for the removal component which is intended to be separated from the remaining component. According to the invention the counter-holder accordingly does not have to be transferred into the fixing state to enable the removal component acted on by the lifting apparatus in the lifting direction to be orientated parallel with the remaining component and to be thereby protected from getting stuck, which would impair the separation process and/or from deformation, which also would impair the separation process.

The orientation of the support plane of the workpiece bearing of devices according to the invention and consequently also the lifting direction are arbitrary. The workpiece bearing may thus orient the workpiece components intended to be separated from each other, for example, horizontally but also vertically. In the first instance, the lifting apparatus separates the removal component from the remaining component with a removal movement in an upward direction or in a downward direction, in the second instance with a removal movement to the right or to the left. Linear removal movements perpendicular to the support plane defined by the workpiece bearing are preferred.

The fixing function of the counter-holder is used to remove the removal component from the vicinity of the remaining component after separation from the remaining component. If the removal component has been separated from the remaining component by means of the lifting apparatus with a vertically upwardly directed or with a horizontal removal movement and if the counter-holder is transferred into the fixing state, the removal component is secured to the counter-holder counter to the action of gravity. The lifting apparatus can consequently be removed from the removal component which is fixed to the counter-holder and can be moved back into the initial position thereof. Using the counter-holder, the removal component which is fixed thereto can ultimately be removed from the workpiece bearing and consequently where applicable out of the operating range of the mechanical arrangement used to produce the removal component and the remaining component.

The characteristics of the rigid abutment formed by the counter-holder can be tailored to the removal component that is to be supported. In particular, the rigid abutment can have a friction lining that prevents the removal component supported on the rigid abutment from sliding in an undesirable manner. It is possible to use as a rigid abutment, for example, a two-dimensional, one-piece abutment, but also an abutment formed by a plurality of abutment elements. If abutment elements can be positioned relative to each other, the rigid abutment can be adapted to changing geometries of the workpiece components that are intended to be supported. Rigid abutments are contemplated to have a planar abutment face as well as an irregularly shaped, three-dimensional abutment face.

According to other embodiments, the counter-holder that supports the removal component at the side remote from the lifting apparatus is switched at the beginning of the removal movement into the releasing state. The fixing function of the counter-holder is accordingly deactivated at a time at which the counter-holder that is applied to the removal component is located in the direct vicinity of the remaining component adjacent to the removal component. The fixing function of the counter-holder is activated only when the counter-holder has traveled at least a portion of the removal movement and consequently is spaced apart from the remaining component to such an extent that, as a result of the transfer of the counter-holder into the fixing state, only the removal component, but not the remaining component, is secured to the counter-holder.

The present inventive features are particularly significant for applications in which the counter-holder as a result of its own dimensions and as a result of the dimensions of the removal component intended to be lifted out is located at the beginning of the removal movement not only above the removal component, but also above the remaining component. In such cases, if the fixing function of the counter-holder were already activated at the beginning of the removal movement, the counter-holder during the subsequent movement would carry not only the removal component, but also the remaining component in an undesirable manner. This would result in a significant disturbance in the operating sequence. According to the invention, it is not necessary to select the size of the counter-holder in such a manner that it does not exceed the size of the removal component to be supported.

Regardless of the current functional state thereof, the counter-holder forms, according to the invention, an abutment that is rigid in the lifting direction for the removal component that is acted on by the lifting apparatus in the lifting direction. During the entire lifting movement, the rigid abutment against the counter-holder ensures a parallel orientation of the removal component with respect to the support plane. Consequently, during the entire removal movement, tilting and deformation of the removal component and a related impairment of the separation process are excluded.

The counter-holder may already have sufficient spacing from the remaining component after a portion of the removal movement, but under some circumstances also only when the removal component has been fully separated from the remaining component, for example, when the removal component and the remaining component no longer overlap each other in the lifting direction.

In the interests of maximum process reliability, in an embodiment of the method according to the invention, the counter-holder is transferred into the fixing state only after finalization of the removal movement.

According to other embodiments, the rigid abutment formed by the counter-holder for the removal component is provided as a retention device that can be switched into an operational state and a non-operational state. In the operational state, the retention device enables the removal component to be fixed to the counter-holder. In the non-operational state of the retention device, the removal component is released from the counter-holder. A dual function of the described type as a rigid abutment and as a retention device that can be activated and deactivated for the removal component may, for example, be carried out by electrostatic grippers, solenoids, or sintering sponges, which can be applied to a vacuum source.

Another embodiment of the invention provides a device that has one or more retention devices in addition to the rigid abutment for the removal component. It is possible to provide as such separate retention devices, in addition to the above device types, for example, conventional suction grippers that are applied with resiliently deformable suction sleeves to the removal component.

In another embodiment of the invention, the counter-holder forms the rigid abutment for the removal component by means of a support body that is rigid in the lifting direction, and for the retention device of the counter-holder, which is provided in addition to the rigid abutment, to be able to be moved relative to the support body in the lifting direction and in the opposite direction to the lifting direction. As a result of the movability thereof, the retention device, when the removal component is, on the one hand, acted on by the lifting apparatus and is, on the other hand, supported by the counter-holder, assumes relative to the support body a position in which it can fix the removal component without impairing the supporting action of the support body. If, for example, the surface of the removal component on which the counter-holder supports the removal component, is not ideally planar, the retention device may as a result of its movability adapt to the extension of the respective surface of the removal component and move relative to the support body that is in abutment with the removal component into a position in which, regardless of the unevenness of the removal component, it is able to fix the removal component that is rigidly supported on the support body in the lifting direction.

Preferably, there are provided as the rigid support body of the counter-holder a dimensionally stable abutment plate and as retention devices suction grippers with resilient suction sleeves accommodated in holes of the dimensionally stable abutment plate. If the counter-holder is spaced apart from the associated removal component, the suction sleeves protrude with respect to the dimensionally stable abutment plate. If the dimensionally stable abutment plate is placed on the removal component before the beginning of the removal movement, the suction sleeves in contact with the removal component may move back into the interior of the holes of the dimensionally stable abutment plate. During the removal movement, the dimensionally stable abutment plate then supports the removal component acted on by the lifting apparatus without impairment by the suction sleeves with an orientation parallel with the support plane. At the same time, the suction grippers are in abutment by means of the suction sleeves with the surface of the removal component. If the suction grippers are activated after a portion of the removal movement or after the removal movement has ended, the retention force required to fix the removal component can be built up at the suction grippers in an operationally reliable manner.

If it is possible, as provided for in another embodiment of the invention, for the support body to be moved by means of a relative movement of the support body and the retention device into a position in which the support body is offset with respect to the retention device in the opposite direction to the lifting direction, the support body can also be used where necessary to release the removal component that is separated from the remaining component from the retention device or to support the release of the removal component from the retention device. As a result of a movement of the support body in the opposite direction to the lifting direction, the removal component can be pressed away from the retention device. Alternatively, pressing elements that are provided separately for this purpose on the counter-holder are also contemplated as part of the present invention.

In another embodiment of the invention the support of the removal component by the counter-holder has a wide base. The removal component is accordingly orientated in parallel with the support plane in an operationally reliable manner.

In another embodiment of the invention, there is provision for the lifting apparatus before the beginning of the removal movement first to be able to approach the removal component to be separated from the remaining component with a positioning movement. Accordingly, it is not necessary for the lifting apparatus to have a sufficiently large size as a result of which it covers the entire region in which workpiece components intended to be separated from each other on a processed workpiece can be arranged. Instead, it is sufficient to have a relatively small lifting apparatus that is moved selectively like a shuttle into the positions in which removal components are intended to be acted on and moved in the lifting direction by the lifting apparatus.

In yet another embodiment of the invention, the positioning movement of the lifting apparatus is controlled in accordance with the characteristics of the removal component. For instance, in accordance with the inherent rigidity, the shape, and/or the dimensions of the relevant removal component, the lifting apparatus must be positioned more or less precisely with respect to the removal component when the component is orientated horizontally by means of a workpiece bearing and acted on and moved by the lifting apparatus. The lifting apparatus has to act on the removal component in a manner to prevent the removal component from getting stuck in the remaining component. With small removal components, an action in the center or in the center of gravity of a surface may be sufficient. In the case of larger removal components and/or removal components of low inherent rigidity, it may be advisable for the action to be carried out in the most extensive manner possible and/or at several positions distributed over the removal component so that flexing or tilting of the removal component is prevented.

The force applied by the lifting apparatus to the removal component can in another embodiment of the invention be adjusted in terms of its value. The force that the lifting apparatus applies to the removal component in the lifting direction is in particular selected in accordance with the load resistance of the removal component, which itself is determined, for example, by the thickness or the material of the removal component.

In another embodiment, the lifting apparatus has at least one lifting device that can be actuated in a controlled manner and by means of which the removal component can be acted on and can be moved with the removal movement in the lifting direction with an orientation parallel with the support plane. The operating methods of such lifting devices may be varied. For example, pneumatic lifting devices as well as mechanical lifting devices can be provided.

Lifting elements that are provided as lifting devices may be resilient in the opposite direction to the lifting direction. Furthermore, for the lifting elements, a multi-component construction is conceivable, wherein the lifting elements have a replaceable contact component, with which the actuated lifting element acts on the removal component. The replaceable contact component may, for example, be adapted in terms of hardness, friction coefficient, or geometry to the removal component that is intended to be acted on.

In some embodiments, a lifting pin can be used as a lifting device or lifting element. With such a locally acting lifting device, removal components with changing geometry and size can be separated from the remaining component in a structurally simple manner.

In some embodiments, it is possible to adapt to changing applications an embodiment of the device according to the invention whose lifting apparatus includes a plurality of lifting devices, which themselves can be actuated in a controlled manner independently of each other. Depending on the application, all or only some of the lifting devices may be used for mutual separation of removal components and remaining components. If the lifting apparatus has as lifting devices a plurality of lifting pins to separate the removal component and the remaining component, the lifting pins are actuated to an extent that is dependent on the size and the shape of the removal component.

In another embodiment of the invention, the lifting devices which can be actuated independently of each other form the workpiece bearing and accordingly perform a dual function.

Generally, different construction types are conceivable for the workpiece bearing of devices according to the invention. For example, a workpiece bearing in the form of a plate-like workpiece support whose main plate plane extends in parallel with the support plane can be used according to the invention. In this instance, the lifting apparatus is arranged at one side of the plate-like workpiece support and the counter-holder is arranged at the opposite side of the plate-like workpiece support. Removal components that are supported on the plate-like workpiece support are accessible for the lifting apparatus via through-openings of the plate-like workpiece support, through which openings the removal components can be acted on in the lifting direction by the lifting apparatus. The cross-sectional size of the through-openings may considerably exceed the cross-sectional size of the lifting devices that engage through the through-openings. In this instance, the lifting devices may be positioned inside the through-openings in a flexible manner adapted to the respective application.

In some embodiments, the through-openings of the plate-like workpiece support predetermine the locations at which the lifting apparatus can act on removal components. The positioning devices that are provided in certain embodiments of the invention serve to position the workpiece components intended to be separated from each other, on the one hand, and the plate-like workpiece support, on the other hand, relative to each other in parallel with the main plate plane in such a manner that removal components are arranged in the region of through-openings of the plate-like workpiece support and are consequently accessible for the lifting apparatus.

In the mechanical arrangement according to additional embodiments, a common workpiece bearing, e.g., a common plate-like workpiece support, acts at the same time as a workpiece bearing for the device for mutual separation of two workpiece components and as a workpiece bearing for the processing device of the mechanical arrangement for a workpiece separating processing operation.

According to additional embodiments, in the mechanical arrangement the removal component and the remaining component, when they are produced by means of the processing device, each assume a processing position and, when they are mutually separated, an unloading position, wherein the processing positions, on the one hand, and the unloading positions, on the other hand, are generally spatially separated from each other, but do not necessarily have to be. The counter-holder of the device for mutual separation of the two workpiece components may approach both the processing position and the unloading position, in particular, of the removal component. Accordingly, the counter-holder of the device for mutual separation of the two workpiece components is capable of also performing functions in the region of the processing device, by means of which the workpiece components that are intended to be separated from each other at a later stage are produced.

Preferably, the counter-holder of the device for mutual separation of the two workpiece components is used in particular on the removal component located in the processing position to position the removal component and the remaining component relative to each other with a desired position when they are produced. This feature of the invention is above all significant in the processing of thin workpieces, because there is a risk in this instance that the removal component directly after being cut free is orientated with respect to the remaining component in a manner that makes subsequent separation of the removal component from the remaining component difficult or even makes it completely impossible. For instance, when laser cutting metal sheets, such an incorrect orientation of the removal component can be produced as a result of the action of a cutting gas beam on the removal component.

The risk of incorrect orientation of the workpiece components produced during the workpiece separating processing operation relative to each other further exists when, on the one hand, the processing positions and, on the other hand, the unloading positions of the removal component and the remaining component are spatially separated from each other and the removal component and the remaining component are moved together from the respective processing position into the respective unloading position. This condition is taken into account in another embodiment of the invention in that the two workpiece components are positioned relative to each other with a desired position during the common movement from the processing positions into the unloading positions thereof by means of the jointly moved counter-holder of the device for mutual separation of the two workpiece components. In this manner, it is possible to prevent the two workpiece components from tilting or sliding relative to each other during the transfer or one of the two workpiece components from moving under the other workpiece component.

To position the two workpiece components during the production and/or transfer relative to each other with a desired position, the counter-holder of the device for mutual separation of the two workpiece components can act on only one of the two workpiece components or on both workpiece components at the same time.

During the production of the two workpiece components by means of the processing device, it is possible to ensure by means of corresponding programming of the processing sequence on the mechanical arrangement according to the invention that the removal component at the time of being completely cut free by means of the counter-holder of the device for mutual separation of the two workpiece components is positioned in a desired position with respect to the remaining component.

In principle, it is possible for the counter-holder of the device for mutual separation of the two workpiece components to be transferred into the releasing state when it positions the two workpiece components relative to each other with a desired position during the production thereof and/or during the transfer from the processing positions thereof into the unloading positions thereof. A counter-holder that is transferred into the fixing state for mutual positioning of the two workpiece components can be used according to another embodiment of the invention. In this instance, in the context of manufacturing methods according to the invention, the counter-holder of the device for mutual separation of the two workpiece components is first moved into the processing position of the removal component and/or the remaining component, where it is switched into the fixing state and in the fixing state positions the two workpiece components relative to each other with a desired position already during the production thereof. Subsequently, the counter-holder, which is continuously switched into the fixing state, is moved together with the workpiece components that have been positioned relative to each other when the workpiece components are transferred from the respective processing position into the respective unloading position. At the unloading side, the counter-holder is then switched into the releasing state in which it supports the workpiece component provided as a removal component and which is acted on by the lifting apparatus of the device for mutual separation of the two workpiece components during the removal movement with an orientation parallel with the support plane.

The invention is explained in greater detail below with reference to schematic illustrations of examples of embodiments of the invention.

DESCRIPTION OF DRAWINGS

FIGS. 12A, 12B, 12C, 12D, 12E, and 12F are illustrations to explain the functionality of a second construction type of a device for mutual separation of finished components and remaining grids.

DETAILED DESCRIPTION

Figure 1:
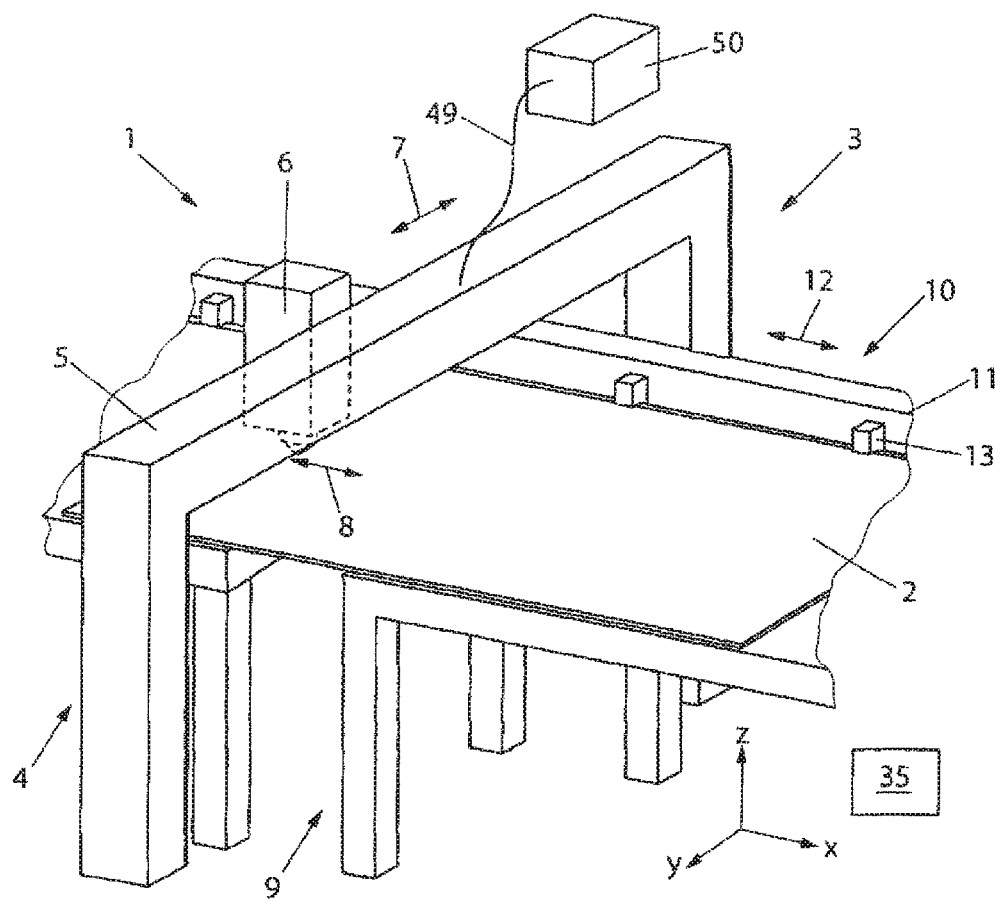
FIG. 1 shows a mechanical arrangement for laser cutting metal sheets. The arrangement includes a laser cutting device.

According to FIG. 1, a mechanical arrangement 1 for a workpiece separating processing operation of metal sheets 2 includes as a processing device a laser cutting device 3. The laser cutting device 3 has a portal-like guiding structure 4 with a transverse portal carrier 5 and a laser cutting head 6, which is guided on the transverse portal carrier 5. In directions that extend perpendicularly relative to each other, the laser cutting head 6 can be moved relative to the transverse portal carrier 5 in the direction of double-headed arrows 7, 8. Via a fiber-optic cable 49, the laser cutting head 6 is connected to a laser beam source, e.g., in the form of a conventional solid state laser 50.

The portal-like guiding structure 4 extends over a two-part workpiece table 9 on which a metal sheet 2 is supported before, during, and after the cutting processing operation. By means of the laser cutting head 6 of the mechanical arrangement 1, the sheet 2 is processed in a separating manner. In this instance, the metal sheet 2 is supported on the workpiece table 9. After the sheet processing operation, finished components, which have been cut free by means of the laser cutting head 6, are separated from a remaining grid that is also produced during the sheet processing operation and subsequently removed from the vicinity of the mechanical arrangement 1.

A sheet movement unit 10, which is illustrated in FIG. 1 in a highly schematic manner, is used to move the metal sheet 2 before, during, and after the processing thereof. The sheet movement unit 10 includes a rail 11, which is movably guided by means of a guiding device in the direction of a double-headed arrow 12 and to which a metal sheet 2 can be fixed by means of clamping claws 13. The guiding device for the rail 11 is of conventional construction and corresponds, for example, to known guiding devices for the transverse rail of coordinate guides for metal sheet processing machines.

By means of the sheet movement unit 10, the metal sheet 2 is positioned for processing in the operating range of the laser cutting head 6. During the processing operation, the metal sheet 2 can be moved by means of the sheet movement unit 10 in the direction of the double-headed arrow 12. Processing movements superimposed therewith in the transverse direction of the double-headed arrow 12 where necessary are carried out by the laser cutting head 6 in the direction of the double-headed arrow 7. Furthermore, the laser cutting head 6 has an additional axis drive that enables short highly dynamic movements of the laser cutting head 6 in the direction of the double-headed arrow 8 and consequently in the movement direction of the sheet movement unit 10. With a final separation cut, the laser cutting head 6 cuts a finished component free from the remaining grid that surrounds the finished component. In this instance, the finished component and the remaining grid on the mechanical arrangement 1 are each in a processing position. After the sheet processing operation has ended, the sheet movement unit 10 transfers the finished component which has now been cut free and the remaining grid together from the respective processing position into an unloading position.

Figure 2:
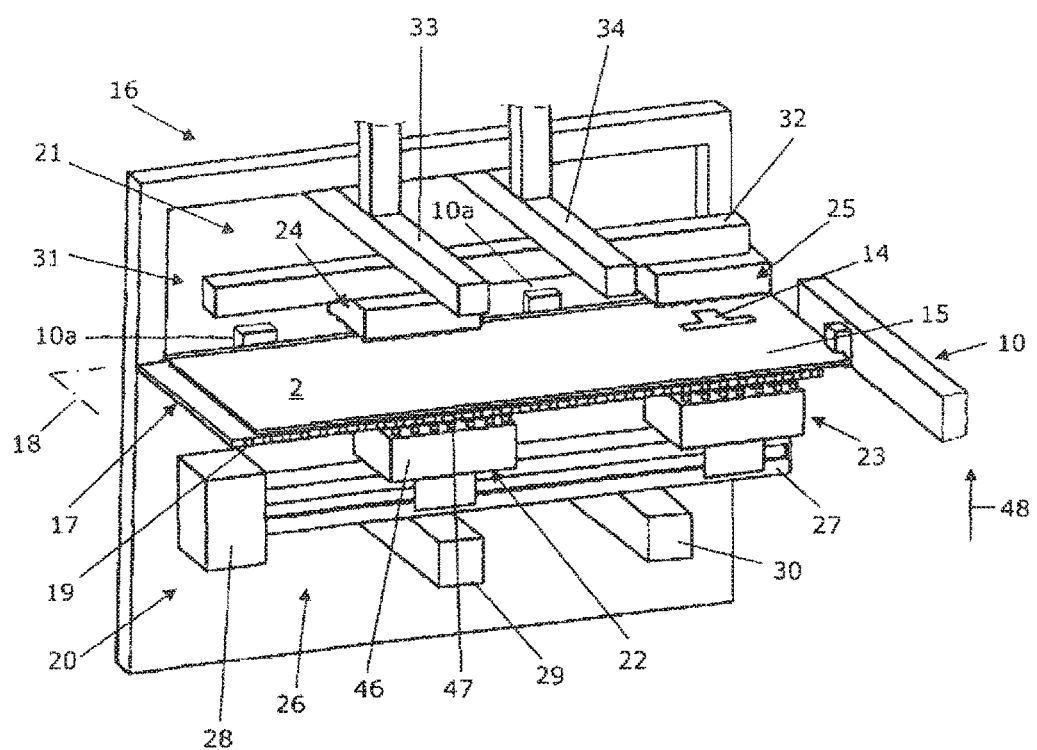
FIG. 2 shows the mechanical arrangement according to FIG. 1 including a device of a first construction type for mutual separation of finished components and remaining grids produced from metal sheets by means of the laser cutting device.

If the finished component that has been cut free and the remaining grid are transferred into the unloading positions thereof, the situation shown in FIG. 2 occurs. For the sake of clarity, FIG. 2 shows on the processed metal sheet 2 only a single finished component 14 surrounded by a remaining grid 15.

By means of an unloading device, the finished component 14 must first be separated from the remaining grid 15 before it can be transported away from the vicinity of the mechanical arrangement 1. The unloading device accordingly acts as a device 16 for mutual separation of the finished component 14 and the remaining grid 15. During the separation operation, the finished component 14 is removed as a removal component out of the remaining grid 15, which itself remains as a remaining component 15 on the workpiece table 9 before it is also removed from the vicinity of the mechanical arrangement 1 after the removal of all the finished components.

A plate-like workpiece support 17 of the workpiece table 9 is used as a workpiece bearing for the remaining grid 15 and the finished component 14. In known manner, the workpiece support 17 is provided at the upper side thereof with bristles or rollers that cannot be seen in FIG. 2 and that enable a friction-free and scratch-free movement of the processed metal sheet 2 over the stationary workpiece support 17. The support locations of the processed sheet 2 on the bristles or the rollers of the workpiece support 17 define a support plane 18 of the workpiece support 17, which is indicated in FIG. 2. The support plane 18 extends parallel with the main plate plane of the workpiece support 17. Along the support plane 18, the finished component 14 and the remaining grid 15 are in alignment with each other. Accordingly, the finished component 14 and the remaining grid 15 are arranged with mutual overlap perpendicular to the support plane 18.

As can be seen in FIG. 2, the workpiece support 17 of the mechanical arrangement 1 is in the example illustrated constructed as a perforated plate with a large number of through-openings 19.

A lifting unit 20 is arranged below the workpiece support 17 and a counter-holder unit 21 of the device 16 is arranged above the workpiece support 17.

The lifting unit 20 includes two structurally identical lifting apparatuses 22, 23 and the counter-holder unit 21 includes two structurally identical counter-holders 24, 25.

The lifting apparatuses 22, 23 can be positioned by means of a lifting movement unit 26 parallel with the support plane 18 at any desired location below the workpiece support 17. To this end, the lifting movement unit 26 has a longitudinal rail 27 along which the lifting apparatuses 22, 23 can move in a state driven in a motorized manner. A drive motor 28 of the lifting apparatuses 22, 23 can be seen in FIG. 2. Together with the lifting apparatuses 22, 23, the longitudinal rail 27 can be moved on two transverse rails 29, 30 of the lifting movement unit 26, which extend perpendicularly to the longitudinal rail 27. The transverse rails 29, 30 can be raised and lowered perpendicularly to the workpiece support 17 or the support plane 18 together with the longitudinal rail 27 and the lifting apparatuses 22, 23 that are guided thereby.

In a corresponding manner, the counter-holders 24, 25 of the counter-holder unit 21 may move in parallel with the support plane 18 in order to approach any location at the processed sheet 2 and may be raised and lowered perpendicularly to the support plane 18. A counter-holder movement unit 31 includes a longitudinal rail 32, along which the counter-holders 24, 25 can be positioned in a state driven in a motorized manner. Together with the counter-holders 24, 25, the longitudinal rail 32 can be moved in a state driven in a motorized manner along two transverse rails 33, 34, which themselves extend perpendicularly to the longitudinal rail 32 and which can be raised and lowered in a vertical direction together with the longitudinal rail 32 and the counter-holders 24, 25 guided thereon.

All the relevant functions of the mechanical arrangement 1 and consequently in particular all the relevant functions of the device 16 are numerically controlled. A numerical control unit 35 is indicated in FIG. 1. The coordinate axes of the numerical control of the mechanical arrangement 1 or the device 16 are designated x, y, z in FIG. 1.

Figure 3:
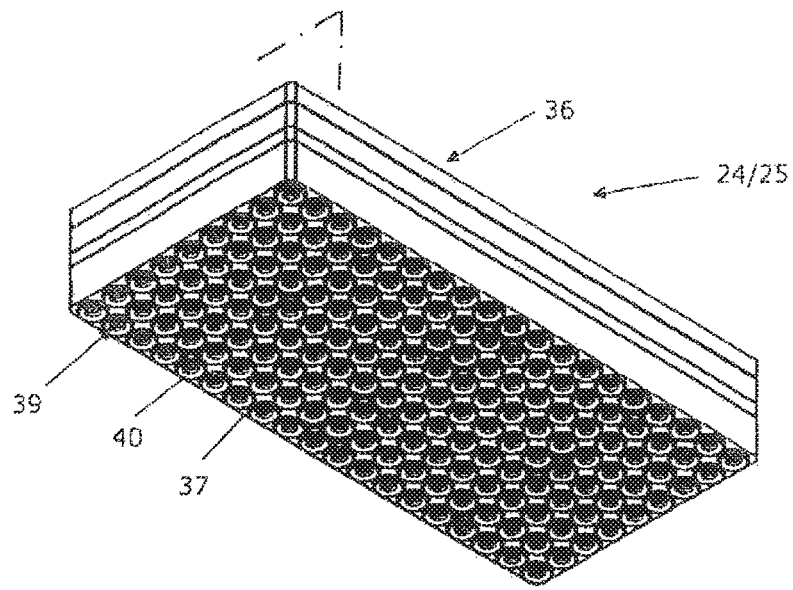
FIG. 3 shows a counter-holder of the device according to FIG. 2 for mutual separation of finished components and remaining grids.
Figure 4:
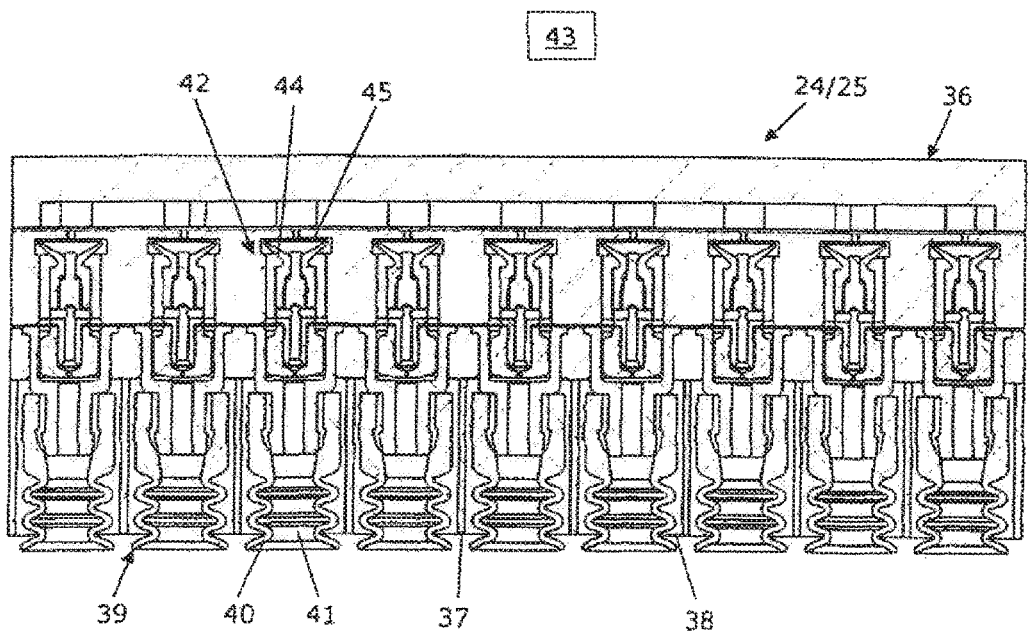
FIG. 4 is a sectional view of the counter-holder according to FIG. 3 with a section plane indicated in FIG. 3.

In FIGS. 3 and 4, one of the structurally identical counter-holders 24, 25 of the unloading device 16 is illustrated in detail. The counter-holders 24, 25 have a case-like counter-holder housing 36 having a planar abutment plate 37, which acts as a support body and which is provided with a large number of holes 38. The holes 38 receive retention devices in the form of suction grippers 39. Folded suction sleeves 40 of the suction grippers 39 protrude in the initial state of the counter-holders 24, 25 with respect to the abutment plate 37 and are resiliently deformable perpendicular to the abutment plate 37. A suction chamber 41 inside each suction sleeve 40 can be connected via a switchable valve 42 to a vacuum production device 43 indicated in FIG. 4, in which the valves 42 are shown to be open. There is consequently a connection (not shown) between the suction chambers 41 of the suction grippers 39 and the vacuum production device 43. The vacuum production device 43 can draw air via the suction chambers 41.

If the inlet side of the suction sleeve 40 of a suction gripper 39 is open and if the vacuum production device 43 is switched on, the relevant valve 42 is closed by the action of the air flow generated by the vacuum production device 43 and which is directed towards the vacuum production device, a sealing lip 44 of the valve 42 being pulled against a sealing face 45 of the counter-holder housing 36. The flow connection that initially exists between the relevant suction chamber 41 and the vacuum production device 43 is thereby interrupted.

If the inlet side of the suction sleeve 40 of a suction gripper 39 is closed, a vacuum is applied to the relevant suction chamber 41 when the vacuum production device 43 is switched on. There is no notable air flow in the direction towards the vacuum production device 43 and the sealing lip 44 of the valve 42 maintains its spacing from the sealing face 45. The valve 42 consequently remains open and a retention force can build up on the suction gripper 39.

As shown in FIG. 2, the structurally identical lifting apparatuses 22, 23 have a lifting housing 46 at which the lifting apparatuses 22, 23 are connected to the longitudinal rail 27 of the lifting movement unit 26. Inside the lifting housing 46, a plurality of conventional pneumatic piston/cylinder units each with a dual-action cylinder (which are not shown in detail in the drawings) are accommodated. A lifting device, e.g., in the form of a lifting pin 47 is connected to each of the pistons.

The piston/cylinder units inside the lifting housing 46 can be controlled separately and can be connected independently of each other to a pressure source (which is not shown in detail). By actuating the piston/cylinder units, the lifting pins 47 are moved in a vertical direction out of the lifting housing 46 or moved back into the lifting housing 46. The size of the cross-section of the lifting pins 47 can be at the most the size of the cross-section of the through-openings 19 on the workpiece support 17. In the example illustrated, the cross-section of the lifting pins 47 is smaller than the cross-section of the through-openings 19.

According to FIGS. 5A and 5B to FIGS. 10A and 10B, the finished component 14 and the remaining grid 15 are separated from each other as follows.

After the finished component 14 has been cut free from the metal sheet 2 using the laser cutting head 6, and at this time the remaining grid 15 has also been produced, the finished component 14 and the remaining grid 15 are moved by means of the sheet movement unit 10 together on the workpiece support 17 from the respective processing position into the respective unloading position, as shown in FIG. 2. In this instance, the processed sheet 2 and the workpiece support 17 are positioned relative to each other in such a manner that the finished component 14 covers a sufficient number of through-openings 19 of the workpiece support 17. As a positioning device for mutual positioning of the workpiece components that are intended to be separated from each other, on the one hand, and the workpiece support 17 on the other hand, there is used, on the one hand, the sheet movement unit 10, by means of which the processed metal sheet 2 can be positioned together with the finished component 14 and the remaining grid 15 in the x direction of the coordinate system of the mechanical arrangement 1. There is provided as an additional positioning device a support movement unit 10*a* that enables a positioning of the workpiece support 17 in the y direction of the coordinate system of the mechanical arrangement 1 and consequently perpendicularly to the movement direction of the sheet movement unit 10. The position that the finished component 14 assumes in the coordinate system of the numerical control of the mechanical arrangement 1 is thus defined.

Figure 5A:
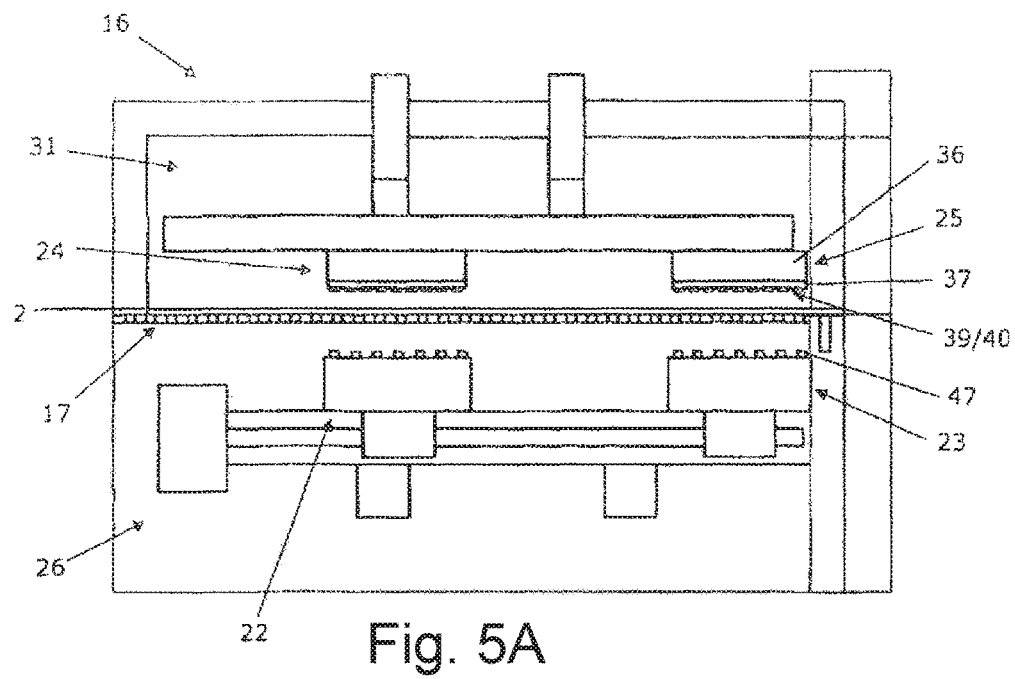
FIGS. 5A, 5B, 6A, 6B, 7A, 7B, 8A, 8B, 9A, 9B, 10A, and 10B are illustrations to explain the functionality of the device shown in FIG. 2 for mutual separation of finished components and remaining grids.
Figure 5B:
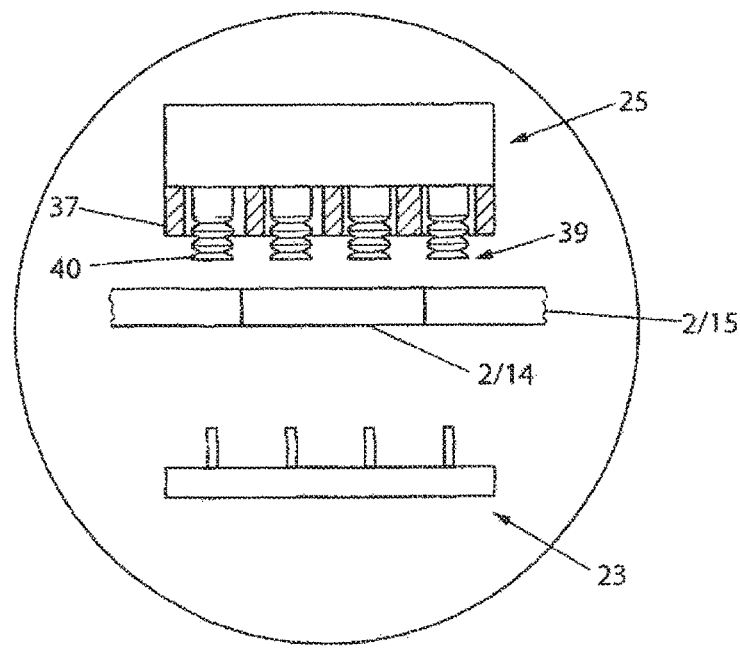

In a numerically controlled manner, the lifting movement unit 26 below the workpiece support 17 is actuated in such a manner that the lifting apparatus 23 moves into a lifting position below the finished component 14. At the same time as the lifting apparatus 23 is positioned, at the opposing side of the workpiece support 17 the counter-holder 25 is moved by means of numerically controlled actuation of the counter-holder/movement unit 31 into a position above the finished component 14, which is located in the unloading position. The conditions as shown in FIGS. 2 and 5A and 5B are consequently produced, wherein FIGS. 5A and 5B show in addition to the entire arrangement a detail showing the highly schematic lifting apparatus 23 and the counter-holder 25 arranged on the finished component 14 and the remaining grid 15 opposite the lifting apparatus 23. The workpiece support 17 is not illustrated in the cut-out for reasons of clarity. Corresponding detailed illustrations appear in FIGS. 6A and 6B to FIGS. 10A to 10B.

The vacuum production device 43 for the counter-holders 24, 25 is switched off at this time, the suction grippers 39 on the counter-holder 25 are spaced apart from the finished component 14 and also from the remaining grid 15, which is also arranged in an unloading position. The suction grippers 39 are consequently in a non-operational state and the counter-holder 25 is consequently in a release state. The suction sleeves 40 of the suction grippers 39 protrude with respect to the abutment plate 37 of the counter-holder housing 36 in the direction towards the processed metal sheet 2.

Figure 6A:
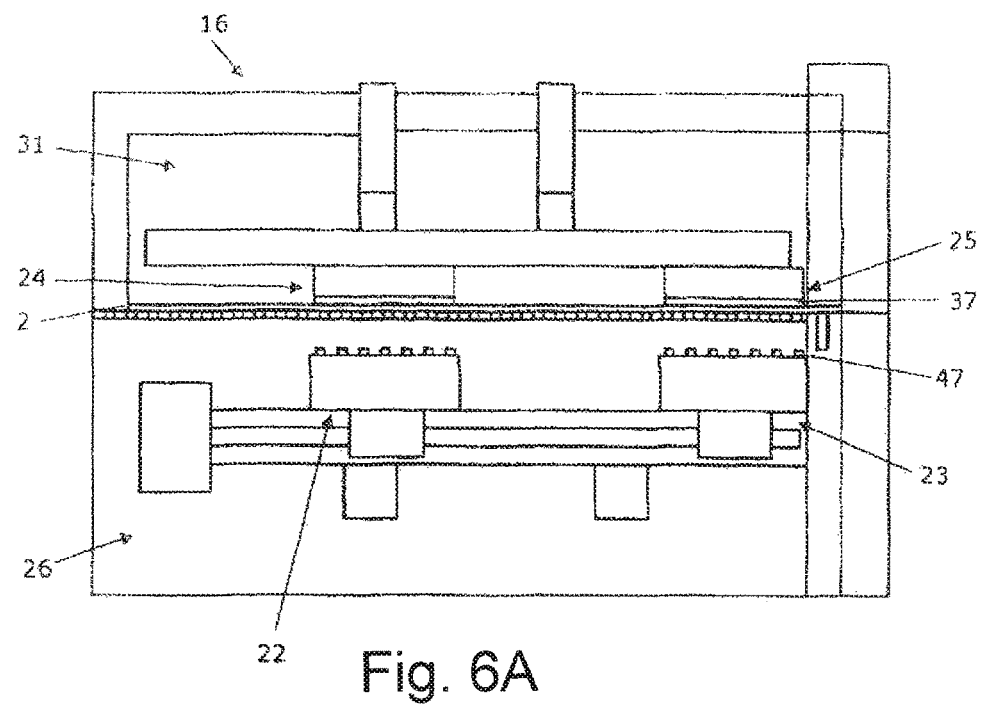
Figure 6B:
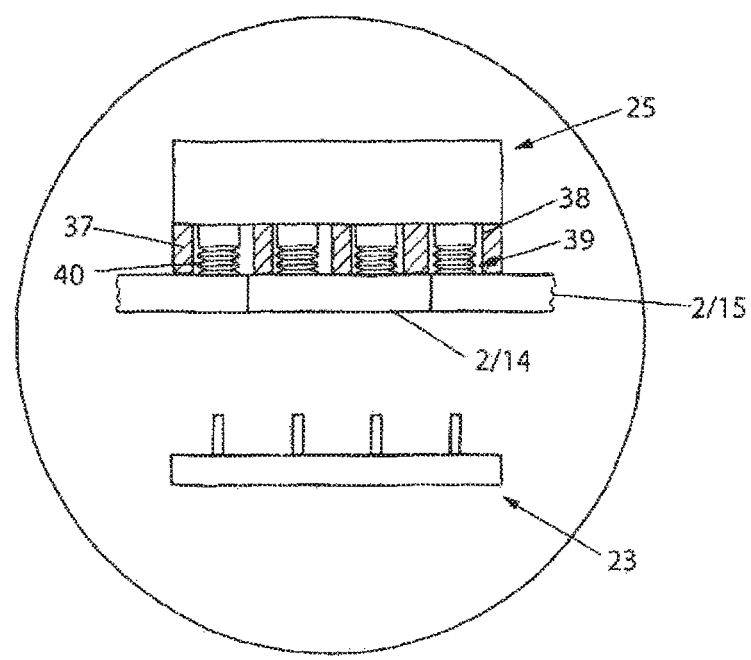

With this operating state, the counter-holder 25 is lowered from the position according to FIGS. 2 and 5A/5B by means of a corresponding vertical movement of the counter-holder movement unit 31 and is thereby placed on the processed metal sheet 2 (FIGS. 6A and 6B). During the lowering movement, the suction grippers 39 of the counter-holder 25 first move with the free ends of the suction sleeves 40 against the upper side of the processed metal sheet 2. When the lowering movement of the counter-holder 25 continues, the suction sleeves 40 of the suction grippers 39 are compressed and consequently folded to a greater extent and urged back into the inner side of the holes 38 in the abutment plate 37 of the counter-holder 25 until finally the abutment plate 37 of the counter-holder 25 with the suction sleeves 40 being in contact with the processed metal sheet 2 contacts the sheet surface.

Since the planar extent of the counter-holder 25 parallel with the processed metal sheet 2 significantly exceeds the dimensions of the finished component 14, only a portion of the suction grippers 39 of the counter-holder 25 are in abutment with the finished component 14. The remaining suction grippers 39 are supported on the remaining grid 15.

Figure 7A:
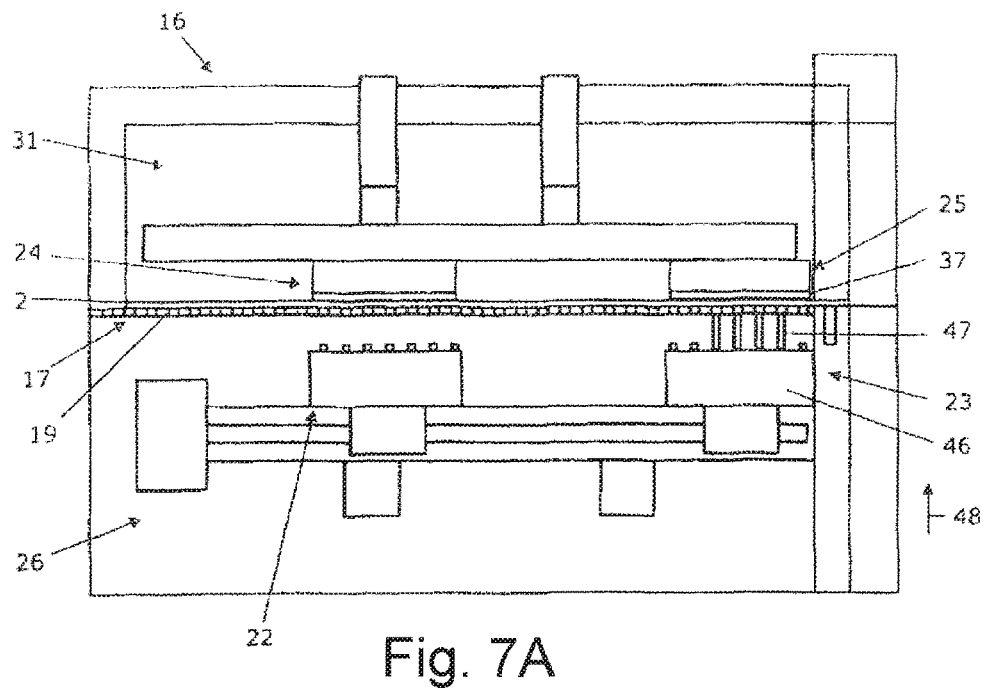
Figure 7B:
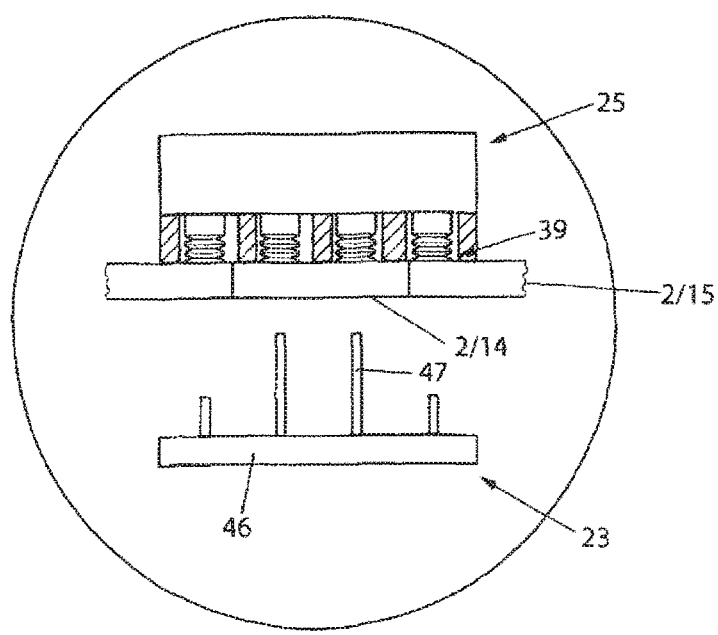

As shown in FIGS. 7A and 7B, there are now actuated on the lifting apparatus 23 the lifting pins 47, which are located below the finished component 14 and for which the finished component 14 is accessible via through-openings 19 of the workpiece support 17.

The remaining lifting pins 47 of the lifting apparatus 23 retain their initial position retracted into the lifting housing 46.

Figure 8A:
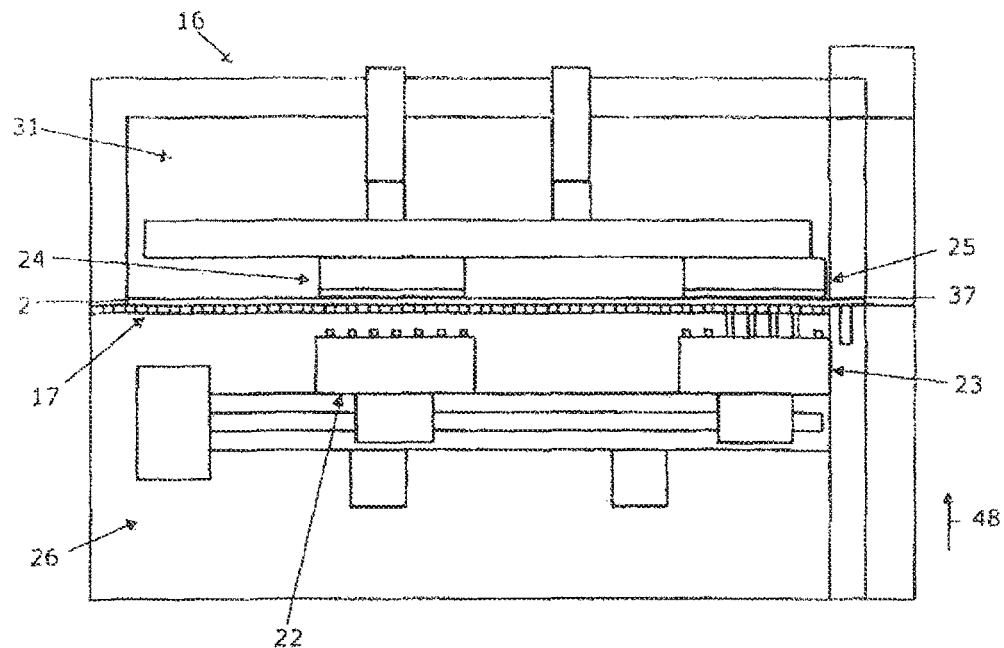
Figure 8B:
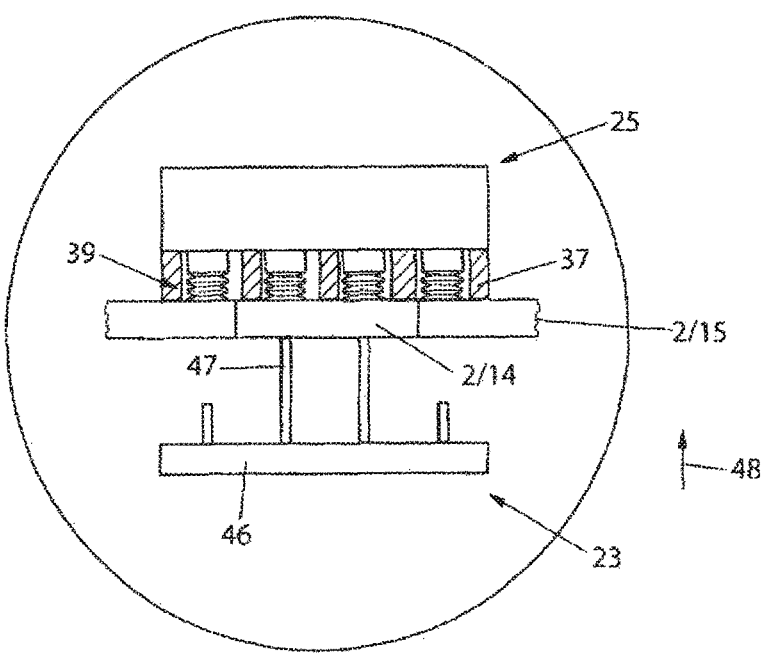

With the lifting pins 47, which are moved out of the lifting housing 46, the lifting apparatus 23 is raised by means of a corresponding lifting movement of the lifting movement unit 26 from the position shown in FIGS. 7A and 7B into the position shown in FIGS. 8A and 8B. In this instance, the lifting pins 47, which have been moved out, are introduced into the through-openings 19 of the workpiece support 17, which are initially opposite them and placed through those through-openings 19 on the lower side of the finished component 14. The finished component 14 is now acted on at the lower side thereof by the lifting apparatus 23 in a lifting direction 48 and is supported across its entire area at the upper side thereof by means of the counter-holder 25, and in particular by the abutment plate 37 of the counter-holder 25, in the lifting direction 48. In this instance, the abutment plate 37 of the counter-holder 25, which is as before switched into the release state, forms for the finished component 14, which is acted on in the lifting direction 48 by the lifting apparatus 23, an abutment that is rigid in the lifting direction 48 in the form of a support body, which supports the finished component 14 with an orientation that is in parallel with the support plane 18 of the workpiece support 17. The suction grippers 39 of the counter-holder 25, which are still in the non-operational state are in abutment with the upper side of the finished component 14, which is orientated in parallel with the support plane 18 with a pre-tensioning that results from resilient deformation thereof.

A pressure increase produced in the pressure supply of the lifting apparatus 23, with the finished component 14 being acted on by the lifting pins 47 of the lifting apparatus 23 and the simultaneous support of the finished component 14 by the abutment plate 37 of the counter-holder 25, indicates for the numerical control of the device 16 that the finished component 14 is clamped between the extended lifting pins 47, on the one hand, and the abutment plate 37 of the counter-holder 25, on the other hand, and is consequently orientated in parallel with the support plane 18.

Figure 9A:
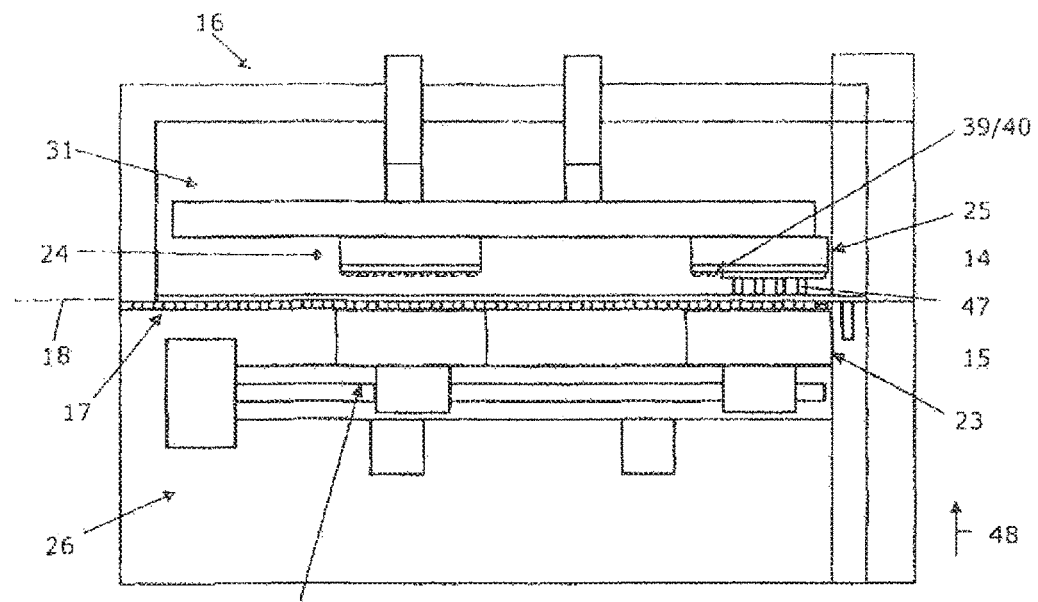
Figure 9B:
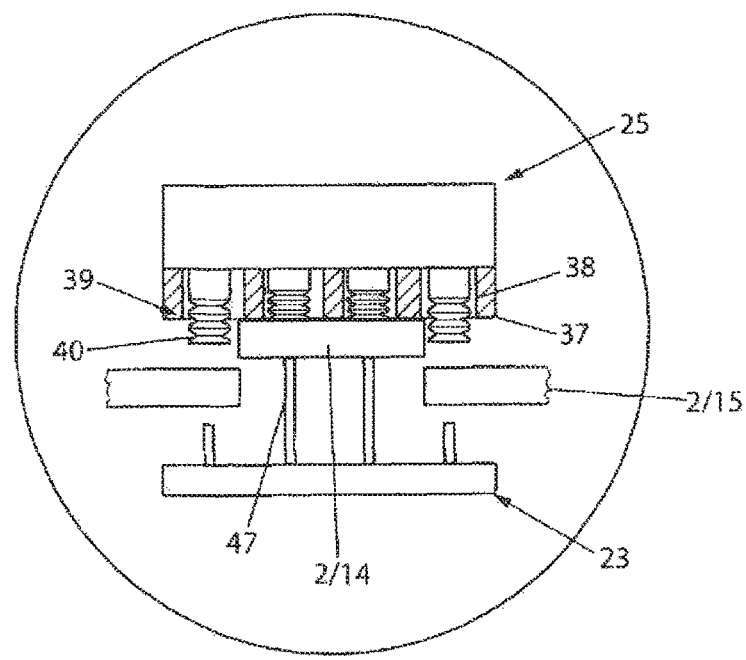
Figure 10A:
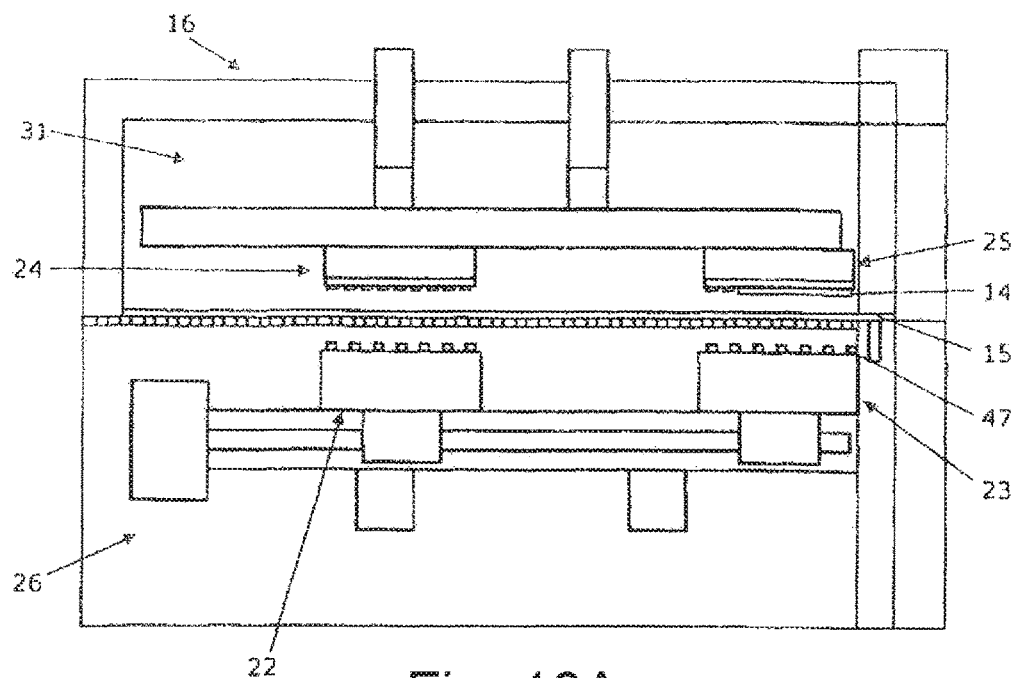
Figure 10B:
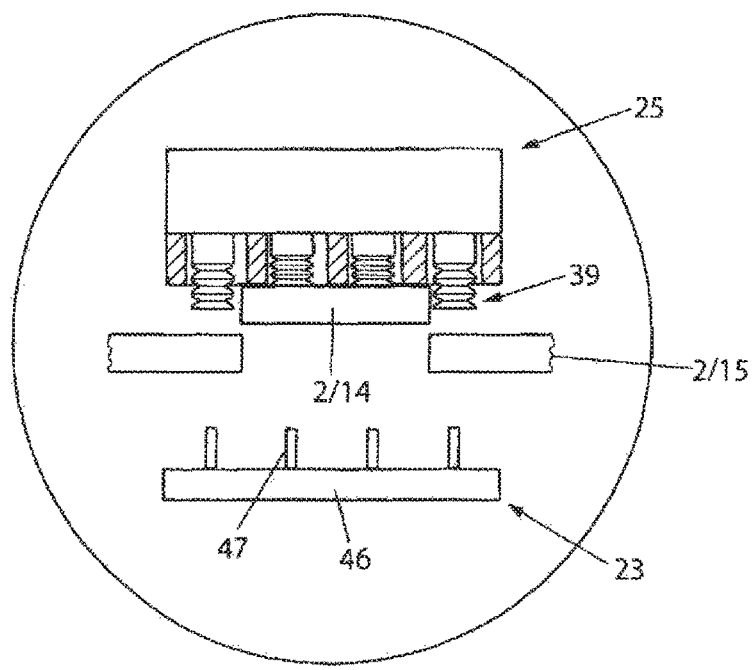

A control signal generated as a result of the pressure increase results in the lifting apparatus 23 and the counter-holder 25 being moved by means of the lifting movement unit 26 and the counter-holder movement unit 31 synchronously with a removal movement in the lifting direction 48. In this instance, the finished component 14, which is initially arranged in the plane of the remaining grid 15, is lifted out of the remaining grid 15 and separated from the remaining grid 15 (FIGS. 9A and 9B). The suction sleeves 40 of the free suction grippers 39, which are not covered by the finished component 14, which sleeves have previously been pressed back into the inner side of the holes 38 in the abutment plate 37 of the counter-holder 25, stretch in the initial phase of the removal movement and act in this instance in the manner of holding-down members on the remaining grid 15, which remains on the workpiece support 17.

As soon as there is established, by means of a displacement measurement system of the numerical control of the device 16, during the common lifting movement of the lifting apparatus 23, the counter-holder 25 and the finished component 14 clamped between the lifting apparatus 23 and the counter-holder 25, a value for the amount of the stroke movement as a result of which it is ensured that even the suction grippers 39 of the counter-holder 25, which are arranged beside the finished component 14 and which protrude with respect to the abutment plate 37 of the counter-holder 25, have a significant spacing from the surface of the remaining grid 15, which has remained on the workpiece support 17, the vacuum production device 43 of the counter-holders 24, 25 is switched on. Consequently, those suction grippers 39 that are in abutment with the finished component 14, are switched from the non-operational state into an operational state. The counter-holder 25 is thereby transferred from the release state into the fixing state in which the finished component 14 is secured to the counter-holder 25. If the finished component 14 is fixed to the counter-holder 25, the lifting pins 47, which have previously acted on the finished component 14, are retracted into the lifting housing 46 of the lifting apparatus 23 and the lifting apparatus 23 is lowered by means of a corresponding lowering movement of the lifting movement unit 26 into the position shown in FIGS. 10A and 10B.

In principle, for example, with a correspondingly large workpiece thickness, free suction grippers of the counter-holders that are not covered by a finished component, already before the removal movement has ended, that is to say, with the still-existing mutual overlapping of the finished component and remaining grid in the lifting direction, may also have such a large spacing from the remaining grid that they can be switched from the non-operational state into the operational state without drawing in the remaining grid in an undesirable manner.

The counter-holder 25 moves with the finished component 14, which is fixed thereto by means of the counter-holder movement unit 31 out of the vicinity of the workpiece support 17.

To release the finished component 14 from the counter-holder 25 at a depositing location for the finished component 14, the suction grippers 39 that retain the finished component 14 are switched into a pressure-free state.

Figure 11A:
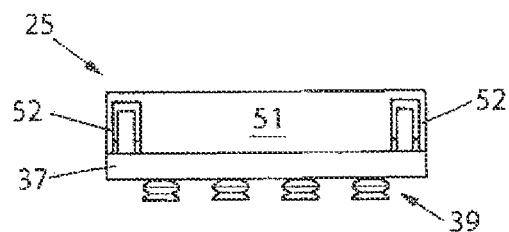
FIGS. 11A and 11B show a specific construction type of the counter-holder according to FIG. 3.
Figure 11B:
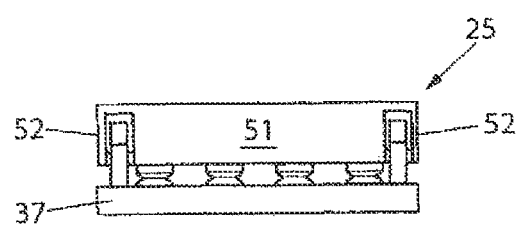

Specific structural measures that serve to configure the release of a finished component 14, which is removed from the vicinity of the workpiece support 17 in a particular operationally reliable manner, are provided in a construction type of the counter-holder 25 illustrated in FIGS. 11A and 11B.

At the counter-holder 25 shown in FIGS. 11A and 11B, the abutment plate 37 can be positioned relative to a base member 51 of the counter-holder 25. To this end, there are provided positioning cylinders 52 by means of which the abutment plate 37 can be moved from a position close to the base member as shown in FIG. 11A into a position remote from the base member as shown in FIG. 11B.

To release a finished component 14, which is retained on one or more suction grippers 39 of the counter-holder 25, the relevant suction grippers 39 are first switched into a pressure-free state. Subsequently, the abutment plate 37 is moved by means of the positioning cylinder 52 from the position shown in FIG. 11A into the position shown in FIG. 11B in which the abutment plate 37 is offset with respect to the suction grippers 39 in the opposite direction to the lifting direction 48. As a result of the movement carried out by the abutment plate 37 relative to the suction grippers 39, the finished component 14 is pressed away from the relevant suction grippers 39. It is thereby ensured that the finished component 14 is reliably released from the counter-holder 25.

Since, in the present example, two device pairs are each provided with a lifting apparatus 22, 23 and a counter-holder 24, 25, the device 16 may at the same time remove two finished components 14 in the manner described above out of the remaining grid 15 and transport them away from the vicinity of the workpiece support 17.

A device 56, which is illustrated in a highly schematic manner in FIGS. 12A to 12F, for mutual separation of finished components 14 and remaining grids 15 differs from the device 16 in that to separate a finished component 14 from a remaining grid 15, not the entire lifting apparatus 23 is raised, but instead the lifting pins 47 of the lifting apparatus 23 perform a lifting action that is increased compared with the relationships shown in FIGS. 2 to 10. Furthermore, there is provided a counter-holder 25 that has for the finished component 14 an abutment plate 37, which is constructed as a planar solenoid 39a and consequently directly forms a planar, dimensionally stable retention device for the finished component 14.

Figure 13:
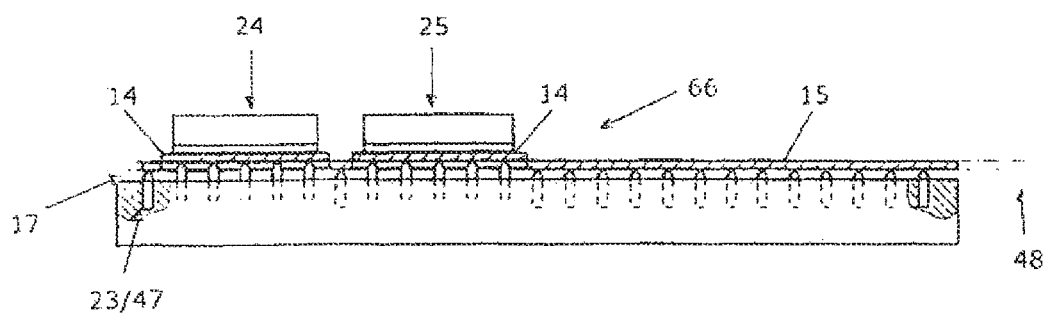
FIG. 13 shows a third construction type of a device for mutual separation of finished components and remaining grids.

FIG. 13 shows a device 66 for mutual separation of finished components 14 and remaining grids 15, in the case of which, in contrast to the devices 15, 56, the lifting pins 47 of the lifting apparatus 23 directly form the workpiece support 17. The lifting pins 47 of the device 66 can also be controlled individually. Too separate finished components 14 from the remaining grid 15, the lifting pins 47 required in the respective application are actuated and lifted in the lifting direction 48.

Figure 14:
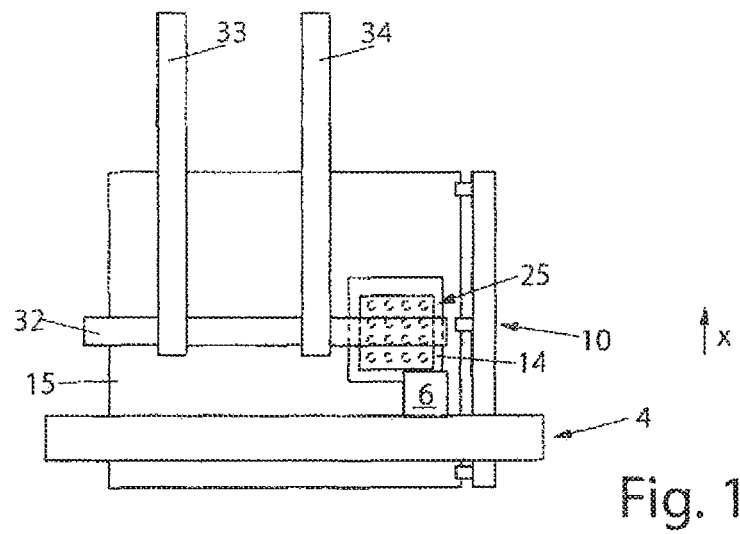
FIGS. 14, 15, and 16 show the counter-holder of the mechanical arrangement according to FIGS. 1 to 10 in a processing position and in an unloading position of a finished component and a remaining grid.
Figure 15:
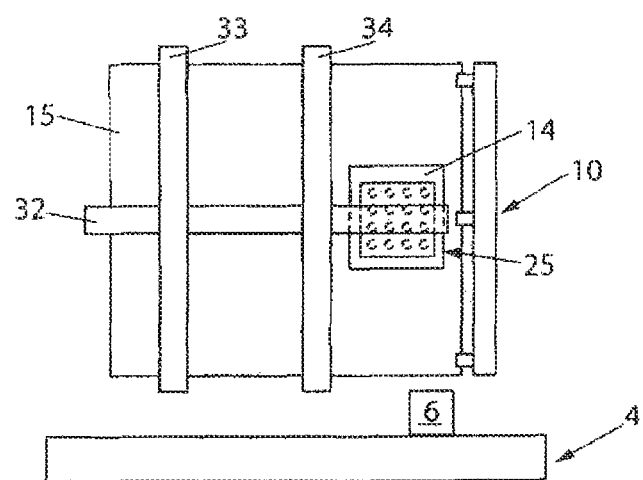
Figure 16:
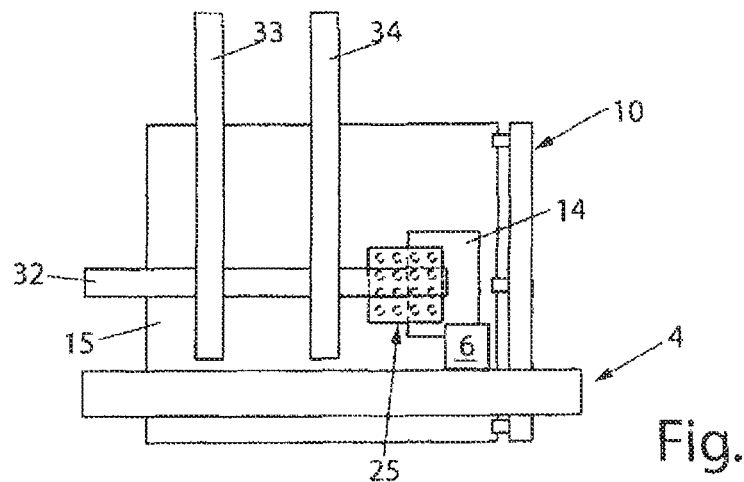

As shown in FIGS. 14 to 16, the counter-holders 24, 25 of the device 16 for mutual separation of the finished component 14 and the remaining grid 15 can be used not only on the finished component 14, which is moved into the unloading position, but also on the finished component 14, which is located in the processing position. Only the counter-holder 25 is shown in detail in the illustrations.

As show in FIG. 14, the counter-holder 25 is moved using the counter-holder movement unit 31 into a position close to the laser cutting head 6. The counter-holder 25 is lowered onto the finished component 14, which has not yet been completely separated from the remaining grid 15 and is in the fixing state. Accordingly, the finished component 14 is secured to the counter-holder 25. The finished component 14 assumes a processing position on the mechanical arrangement 1 and protrudes relative to the counter-holder 25 towards the laser cutting head 6 to such an extent that the final separation cut with which the finished component 14 is cut free from the remaining grid 15 can be produced. The remaining grid 15 is retained by the clamping claws 13 of the sheet movement unit 10 in a processing position. As a result of it being fixed to the counter-holder 25, the finished component 14 retains after the final separation from the remaining grid 15 with respect thereto an orientation as a result of which the finished component 14 is in alignment with the remaining grid 15 and is in particular not tilted inside the remaining grid 15.

If the finished component 14 is cut completely free, the sheet movement unit 10 with the remaining grid 15 secured thereto and the counter-holder 25, which is still switched into the fixing state together with the finished component 14 fixed thereto, move synchronously in the x direction of the coordinate system of the mechanical arrangement 1. The finished component 14 and the remaining grid 15 thereby move from their processing positions according to FIG. 14 into the unloading positions according to FIG. 15. The finished component 14 and the remaining grid 15 are now transferred from the processing positions thereof into the unloading positions thereof. The sheet movement unit 10 and the counter-holder movement unit 31 are used as a workpiece transfer device.

During the transfer, the position of the finished component 14 relative to the remaining grid 15 changes at most only slightly. As a result, the finished component 14 is positioned in the unloading position in such a manner with respect to the remaining grid 15 that it can be readily removed from the remaining grid 15 in the manner described above.

To this end, the suction grippers 39 of the counter-holder 25, which has until now been in the fixing state, are switched into a pressure-free state. Consequently, the counter-holder 25, which is applied to the finished component 14, is in the release state according to FIGS. 6, 7, and 8. At the time of switching the counter-holder 25 from the fixing state into the release state, the lifting apparatus 23 can already assume a lifting position at the lower side of the workpiece support 17. If the lifting apparatus 23 is already moved into a lifting position when the counter-holder 25 is switched, the lifting pins 47, which are used for the separation of the finished component 14 from the remaining grid 15, can first still be retracted into the lifting housing 46 (relationships according to FIGS. 6A and 6B).

Alternatively, it is possible for the lifting pins 47 that are used for the separation of the finished component 14 from the remaining grid 15, when the counter-holder 25 is switched from the fixing state to the release state, to already be moved out of the lifting housing 46 and in this instance either to be spaced apart from the finished component 14 (relationships shown in FIGS. 7A and 7B) or to already act on the finished component 14 in the lifting direction 48 (relationships shown in FIGS. 8A and 8B). In any case, the finished component 14 starting from the existing relationships during the switching of the counter-holder 25 can be separated from the remaining grid 15 in the manner described above.

Unlike FIG. 14, FIG. 16 shows the counter-holder 25 of the device 16 for mutual separation of the finished component 14 and the remaining grid 15, which counter-holder 25 is switched into the fixing state, as it is applied both to the finished component 14 located in the processing position and to the remaining grid 15 arranged in the processing position. Since the counter-holder 25 fixes the finished component 14 and is at the same time secured to the remaining grid 15, the counter-holder 25 can position the finished component 14 after the final operation for cutting free in a particularly operationally reliable manner with a desired position with respect to the remaining grid 15 and maintain this desired positioning during the common transfer of the finished component 14 and the remaining grid 15 from the respective processing position into the respective unloading position.

If the finished component 14 and the remaining grid 15 are transferred into their unloading positions, the counter-holder 25 that covers both the finished component 14 and the remaining grid 15 is first transferred out of the fixing state into the release state. At this time, the lifting apparatus 23 can already be moved at the lower side of the workpiece support 17 into a lifting position.

Depending on the corresponding characteristics of the finished component 14, and in particular if the finished component 14 has an inherent rigidity, the lifting pins 47 of the lifting apparatus 23 that are used to separate the finished component 14 from the remaining grid can potentially already act on the finished component 14 in the lifting direction 48 when the counter-holder 25 is switched. This is because, if the finished component 14 has adequate inherent rigidity, the present methods do not affect the desired orientation of the finished component 14 with respect to the remaining grid 15 when the counter-holder 25 supports only a relatively small region of the finished component 14 acted on by the lifting apparatus 23 in the lifting direction 48. Otherwise, the counter-holder 25 that is switched into the release state before the lifting apparatus 23 is moved into the operational state according to FIGS. 8A and 8B, first has to be moved at the upper side of the finished component 14 into a position in which it supports the finished component 14 more extensively than before in the lifting direction 48. For the rest of the process, in the mechanical arrangement 1 for separating the finished component 14 from the remaining grid 15, the procedure as described above is followed.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. A method for mutual separation of two workpiece components of a plate-like workpiece, the method comprising
supporting the two workpiece components that are intended to be separated from each other by means of a workpiece bearing with mutual overlapping perpendicular to a support plane defined by the workpiece bearing;
lifting one of the workpiece components that are intended to be separated from each other in a lifting direction perpendicularly to the support plane by a lifting apparatus comprising one or more lifting devices arranged at one side of the support plane, wherein the lifted workpiece component is provided as a removal component and wherein the lifting apparatus is provided with a numerically controlled lifting movement unit comprising one or more rails configured to move the lifting apparatus in the lifting direction;
supporting the removal component that is lifted by the lifting apparatus in the lifting direction by a counter-holder comprising a support body, wherein the counter-holder can be transferred into an operational, fixing state and into a non-operational, releasing state, wherein the counter-holder is arranged at a side of the support plane opposite a side of the lifting apparatus, wherein the counter-holder is provided with a numerically controlled counter-holder movement unit comprising one or more rails configured to move the counter-holder in the lifting direction; and
moving the removal component which is acted on by the lifting apparatus and which is supported by the counter-holder with a removal movement in the lifting direction perpendicular to the support plane by the lifting apparatus perpendicular to the support plane relative to the other workpiece component provided as a remaining component and thereby separating the removal component from the remaining component, wherein the lifting movement unit and the counter-holder movement unit are numerically controlled such that the counter-holder supporting the removal component moves in the lifting direction synchronously with the lifting apparatus acting on the removal component and performing the removal movement in the lifting direction, and wherein the removal component which is lifted by the lifting apparatus in the lifting direction is supported during the removal movement in a rigid manner by the counter-holder in the lifting direction with a parallel orientation with respect to the support plane, which counter-holder is in the releasing state in which the removal component is released therefrom.

2. The method of claim 1, further comprising:
transferring the counter-holder into the releasing state before the beginning of the removal movement and into the fixing state after the removal movement is at least partially completed; and
supporting the removal component during the removal movement by means of the counter-holder that has been transferred into the releasing state in the lifting direction with an orientation that is parallel with the support plane.

3. The method of claim 1, wherein the lifting apparatus further comprises a housing connected to at least one of the one or more rails of the lifting movement unit.

4. The method of claim 1, wherein the support body comprises one or more electrostatic grippers, solenoids, or sintering sponges.

5. The method of claim 1, wherein the support body is rigid in the lifting direction.

6. The method of claim 1, wherein the counter-holder further comprises a housing connected to at least one of the one or more rails of the counter-holder movement unit.

7. The method of claim 1, wherein the one or more rails of the lifting movement unit comprise a longitudinal rail and one or more transverse rails.

8. The method of claim 1, wherein the one or more rails of the counter- holder movement unit comprise a longitudinal rail and one or more transverse rails.

9. The method of claim 1, wherein the lifting devices each comprise a lifting pin connected to a piston and cylinder unit.

10. The method of claim 9, wherein the piston and cylinder unit comprises a pneumatic piston and cylinder unit.

11. The method of claim 1, wherein the counter-holder further comprises one or more retention devices.

12. The method of claim 11, wherein the one or more retention devices comprise suction grippers, electrostatic grippers, solenoids, or sintering sponges.

13. A manufacturing method comprising:
producing two workpiece components from a plate-like workpiece by a separating workpiece processing operation; and
separating the two workpiece components from each other after the production thereof using the method of claim 1 for mutual separation of the two workpiece components.

14. The manufacturing method of claim 13, further comprising:
producing the two workpiece components in a processing position;
separating the two workpiece components from each other in an unloading position; and
moving the counter-holder into the processing position and into the unloading position of at least one of the two workpiece components.

15. The manufacturing method of claim 14, wherein the two workpiece components, during the production thereof, are positioned relative to each other in a predetermined position by the counter-holder that has been moved into the processing position of at least one of the two workpiece components.

16. The manufacturing method of claim 15, wherein the two workpiece components are positioned relative to each other in a predetermined position by the counter-holder that has been transferred into the fixing state.

17. The manufacturing method of claim 14, wherein the two workpiece components, after they have been produced, are moved together from the respective processing position into the respective unloading position, wherein the counter-holder is jointly moved with the two workpiece components, and wherein the two workpiece components, when they are moved together from the respective processing position into the respective unloading position, are positioned relative to each other in a predetermined position by the jointly moved counter-holder.

18. The manufacturing method of claim 17, wherein the two workpiece components are positioned relative to each other in a predetermined position by the counter-holder that has been transferred into the fixing state.

\* \* \* \* \*